(12) United States Patent
Kunene et al.

(10) Patent No.: US 11,314,533 B2
(45) Date of Patent: Apr. 26, 2022

(54) VIRTUAL DESKTOP MANAGEMENT METHOD AND SYSTEM

(71) Applicant: ZUDOMANZI (PTY) LTD, Durban (ZA)

(72) Inventors: Zosokuma Sepiri Kunene, Durban (ZA); Re Kunene, Durban (ZA); Ra Kunene, Durban (ZA)

(73) Assignee: ZUDOMANZI (PTY) LTD, Durban (ZA)

( * ) Notice: Subject to any disclaimer, the term of this patent is extended or adjusted under 35 U.S.C. 154(b) by 0 days.

(21) Appl. No.: 16/645,784

(22) PCT Filed: Sep. 7, 2018

(86) PCT No.: PCT/IB2018/056827
§ 371 (c)(1),
(2) Date: Mar. 9, 2020

(87) PCT Pub. No.: WO2019/049073
PCT Pub. Date: Mar. 14, 2019

(65) Prior Publication Data
US 2020/0272484 A1 Aug. 27, 2020

(30) Foreign Application Priority Data
Sep. 7, 2017 (ZA) .................................. 2017/06086

(51) Int. Cl.
*G06F 9/451* (2018.01)
*G06F 3/0482* (2013.01)
*G06F 3/14* (2006.01)
*H04L 67/025* (2022.01)
*H04L 67/55* (2022.01)

(52) U.S. Cl.
CPC ............ *G06F 9/452* (2018.02); *G06F 3/0482* (2013.01); *G06F 3/1454* (2013.01); *H04L 67/025* (2013.01); *H04L 67/26* (2013.01)

(58) Field of Classification Search
CPC ...... G06F 9/452; G06F 3/0482; G06F 3/1454; H04L 67/025; H04L 51/04
See application file for complete search history.

(56) References Cited

U.S. PATENT DOCUMENTS

| | | | | |
|---|---|---|---|---|
| 8,214,747 | B1 * | 7/2012 | Yankovich | G06F 9/4451 715/751 |
| 9,635,091 | B1 * | 4/2017 | Laukkanen | H04L 67/38 |
| 10,133,461 | B1 * | 11/2018 | Roberts | G06F 9/451 |
| 2004/0225968 | A1 | 11/2004 | Look et al. | |
| 2005/0066037 | A1 | 3/2005 | Song et al. | |

(Continued)

OTHER PUBLICATIONS

PCT/IB2018/056827 International Search Report and Written Opinion dated Dec. 27, 2018, 12 pages.

*Primary Examiner* — Ryan F Pitaro
(74) *Attorney, Agent, or Firm* — Lathrop GPM LLP

(57) ABSTRACT

A virtual desktop management which includes establishing a log-on session and loading a first user's desktop on a computer of the first user, capturing a virtual workspace by taking a snapshot of the state of the first user's desktop, saving the captured virtual workspace of the first user for automated retrieval of the captured virtual workspace by any one of the first user and a second user during the log-on session or during a subsequent log-on session.

14 Claims, 6 Drawing Sheets

(56) References Cited

U.S. PATENT DOCUMENTS

| | | |
|---|---|---|
| 2005/0097506 A1 | 5/2005 | Heumesser |
| 2006/0080432 A1* | 4/2006 | Spataro .................. H04L 67/38 709/224 |
| 2008/0034038 A1* | 2/2008 | Ciudad ................ G06Q 10/107 709/204 |
| 2010/0070899 A1* | 3/2010 | Hunt ...................... G06F 16/95 715/769 |
| 2011/0055299 A1 | 3/2011 | Phillips |
| 2011/0078578 A1* | 3/2011 | Calis ...................... G06Q 30/02 715/740 |
| 2011/0239133 A1* | 9/2011 | Duffus ................... G06F 9/461 715/753 |
| 2012/0066607 A1* | 3/2012 | Song ..................... G06F 9/5077 715/737 |
| 2012/0317500 A1* | 12/2012 | Kosseifi ............... G06Q 10/101 715/753 |
| 2013/0179673 A1 | 7/2013 | Innes et al. |
| 2014/0258235 A1* | 9/2014 | Jin ...................... G06F 9/45558 707/639 |
| 2014/0344806 A1 | 11/2014 | Suresh et al. |
| 2015/0373096 A1* | 12/2015 | Chandrasekaran ......................... H04L 67/1014 709/226 |
| 2016/0132310 A1* | 5/2016 | Koushik .................. G06F 8/61 717/176 |
| 2016/0274980 A1* | 9/2016 | Kim .................... G06F 11/1453 |
| 2017/0149853 A1* | 5/2017 | Furuichi ................ H04L 67/18 |
| 2018/0367484 A1* | 12/2018 | Rodriguez ........... G06Q 10/101 |
| 2019/0268475 A1* | 8/2019 | Moran ................ H04M 3/5175 |

\* cited by examiner

VIRTUAL DESKTOP MANAGEMENT METHOD AND SYSTEM

FIELD OF THE INVENTION

This invention relates to a virtual desktop management method, and a virtual desktop management system.

The invention is expected to be advantageously applicable to workflow management between users of desktop, mobile software, and web-based software applications.

In computing and graphical user interface (GUI) terms traditionally, the term "workspace" refers to the grouping of windows meant to reduce clutter and make a desktop easier to navigate. The related term: "desktop environment" is an implementation of the desktop metaphor, denoting a bundle of programs running on an operating system and sharing a common GUI. A desktop environment typically consists of icons, windows, toolbars, folders, wallpapers and widgets. The "desktop environment" was seen mostly on personal computers until the rise of mobile computing. In this specification, the term "workspace" should be interpreted broadly to include the traditional "desktop environment" and equivalent implementations on personal electronic and mobile devices.

In computing terms, a "session" generally refers to a semi-permanent interactive information exchange, also known as a dialogue, between two or more communicating devices, or between a computer and a user, the latter known as a "log-on session". A session is established at a certain point in time, and then torn down at some later point. A "log-on session" thus refers to the period of activity between a user logging in and logging out of a system. A "log-on session" is typically, but not always, stateful, meaning that the computer saves information about the session history in order to communicate with the user.

The process of keeping track of a user's activity across "log-on sessions" of interaction with a computer is known as session management. Typical session management tasks in a desktop environment include keeping track of those applications that are active and the documents each application has opened, so that the same state can be restored when the user logs out and logs in later. To this end, desktop session management saves and restores desktop sessions, whereas browser session management saves and restores browser sessions.

BACKGROUND OF THE INVENTION

The inventors are aware of the known "virtual desktop": a term used to describe how the virtual space of the computer's desktop environment is expanded beyond the physical limits of the screen's display area through the use of software. Switchable virtual desktops allow users to make virtual copies of their desktop view-port and switch between them. For example, Unix™-like system use a program known as a "window manager" to handle decoration, placement and management of windows, whilst Mac OS™ was, at one point, shipped with native virtual desktop support known as Spaces™.

Spaces™ allows users to create multiple user desktops suited to the unique needs or work habits of a user. A user could, for example, assign a space to office work, enabling the user to leave a work-related application running full screen and then switch to a different space dedicated for browsing the Internet.

Usually, upon creating a log-on session, a user would repetitively perform certain set tasks such as opening an email client, browsing a folder, opening a document for editing and the like, accompanied by a constant need to rearrange windows. The inventors have identified a drawback of known switchable virtual desktops as described above in that users are repeatedly required to re-create their desired virtual desktop environments subsequent to logging in (establishing a log-on session), resulting in decreased productivity.

The inventors have further identified a need for users' sharing of their desktop environments with other users. The need for desktop sharing has been only partially addressed by what is known as "Desktop Sharing", which allows for the remote access (and remote collaboration) to the whole of a user's computer—not only the desktop environment—through a terminal emulator. This is achieved via remote log-on that allows a user to connect to a desktop while being physically away from their computer. Aside from the drawback of remote log-on resulting in access to the whole of the shared computer, desktop sharing is confined to sharing with a limited number of users and requires sharing log-on credentials of the host computer to a user.

Aside from the aforementioned virtual desktops and desktop sharing, the inventors are aware of backup software applications, such as the Mac OS™ Time Machine™ application. Such applications are limited in their use to the backup and restoration of a user's computer, particularly to and from a locally attached storage disk, and are not aimed at or equipped to share backups with multiple users.

The present invention aims to overcome, amongst other, these drawbacks and aims to provide an improved desktop workspace session management method.

SUMMARY OF THE INVENTION

According to a first aspect of the invention, there is provided a virtual desktop management method, the method being conducted by a virtual desktop management system, the method including:

establishing a log-on session and loading a first user's desktop on a computer of the first user;

capturing a virtual workspace by taking a snapshot of the state of the first user's desktop;

saving the captured virtual workspace of the first user for automated retrieval of the captured virtual workspace by any one of the first user and a second user during the log-on session or during a subsequent log-on session.

The method may include the steps of invoking contact details of a second user;

sharing the virtual workspace with the second user for retrieval of the virtual workspace by the second user on a computer of the second user.

The snapshot of the state of the first user's desktop may include any one or more of a list of open software applications, for example a spreadsheet and a web browser, their locations on screen, and a desktop layout of the first user.

The step of capturing the virtual workspace may include capturing attributes of the open software applications.

The attributes being captured may include any one or more of the following:

session name;

session date (i.e. when the session was last saved or opened);

application name (i.e. the name of the desktop application that is used to open the application);

application instance (i.e. the number of windows related to a particular application);

window state (i.e. whether the window is minimized, restored or maximised);

window position (i.e. the X and Y coordinates of the window's top left corner);

window height and width;

platform operating system name and version;

platform machine name (i.e. the name by which the operating system identifies the computer);

platform screen resolution (i.e. the maximum screen resolution of the display of the computer screen); and document or uniform resource locator (URL) name (i.e. if referring to desktop applications, this field can refer to a file extension (.docx for MS Word) for example. If referring to browser URL's, this refers to the URL that the virtual desktop management method has captured from the browser's URL address bar on its particular tab).

It is to be appreciated that these attributes are merely examples of attributes that can be captured and the invention extends to any type of attributes that may be captured to recreate a particular workspace.

The step of capturing of the virtual workspace may include capturing a computer system state and an operating system state of the first user, including, but not limited to any one or more of its central processing unit (CPU)'s state, memory state, disk capacity, and screen resolution.

The steps of capturing a virtual workspace and saving the captured virtual workspace may be implemented by any one or more of a desktop virtual workspace software application installed on the computer of the first user, and a mobile virtual workspace software application installed on the computer of the first user. To this end, the term "computer" should be interpreted broadly to include desktop computers and personal electronic devices such as mobile phones.

The virtual desktop management method may include the step of hosting a remote virtual workspace software application on a remotely accessible server to which any one or more of the desktop- and mobile virtual workspace software applications are logically connected.

The step of sharing of the virtual workspace with the second user may include transmitting the virtual workspace to the second user via the remote virtual workspace software application.

Any one or both the remote virtual workspace software application and the remotely accessible server may be cloud-based.

Any one or more of the desktop-, mobile-, and remote virtual workspace software applications may include a menu, such as a dock, operatively providing the software applications' functionality.

The menu may include a view of the invoked contact details of the second user.

The view of the invoked contact details of the second user may include contact details of other users.

The view of the invoked contact details of the second user may be in the form of any one of a list view, a social media contacts-type view, a messenger-type view or a chat-type view.

Any one or more of the desktop-, mobile-, and remote virtual workspace software applications may include a messaging application, such as an email or social media messaging application.

In one embodiment, a proprietary social media messaging application may be integrated into any one or more of the desktop-, mobile-, and remote virtual workspace software applications.

In another embodiment, $3^{rd}$ party messaging and social media applications may be integrated into any one or more of the desktop-, mobile-, and remote virtual workspace software applications.

The desktop-, mobile-, and remote virtual workspace software applications may include any one of a list-, tiled-, stackable-, floating-, grid-, full-screen-, and carousel-type layout of the list of open software applications.

Sharing of the virtual workspace with the second user may include the steps by which the first user selects and shares files and attachments directly with the second user via any one of the proprietary or the $3^{rd}$ party messaging applications.

The step of sharing the virtual workspace with the second user may include sharing the virtual workspace via push technology. In this context, the term "push technology" is used to refer to the ability to forward to a second user the snapshot of the captured virtual workspace of the first user. The second user who receives a "Portal Push" notification from the first user will be presented with a brief summary of the snapshot. This includes a screenshot of the first user's virtual workspace along with the first user's session specific data.

A virtual workspace software application of the second user may be operable to launch a session sent via the push technology, by accessing data from the remotely accessible server which are cloud-based.

The step of saving the captured virtual workspace of the first user may include saving the virtual workspace to any one or more of the first user's computer locally and the remotely accessible server that hosts the remote virtual workspace software application.

The virtual desktop management method may include providing users with virtual workspace templates, for "work", "social", "leisure", "personal", and the like templates.

The virtual desktop management method may include, subsequent to establishing the log-on session, performing an automated routine of pre-defined tasks, or user selected tasks, such as opening of applications within the virtual workspace and arranging the layout of application windows within the virtual workspace.

The virtual desktop management method may include the step of retrieving of the saved virtual workspace in a subsequent log-on session by any one or more of the first and second users.

The step of retrieving of the saved virtual workspace may include retrieving the saved virtual workspace from the cloud-based remotely accessible server that hosts the remote virtual workspace software application. Such retrieval of the saved virtual workspace would equate to restoring a backup of the virtual workspace.

According to another aspect of the invention, there is provided a virtual desktop management system for implementing the virtual desktop management method as described, the system including:

a remote virtual workspace software application resident on a remotely accessible server to which a database is connected; and a desktop virtual workspace software application operationally installed on a computer of a first user, wherein the desktop virtual workspace software application is operable to establish a log-on session and load a desktop of the first user on the computer of the first user, to capture a virtual workspace of the first user by taking a snapshot of the state of the first user's computer, to save the virtual workspace of the first user, to invoke the contact details of a second user for automated retrieval of the saved virtual workspace of the first user in a subsequent log-on session and to share the virtual workspace with the second user for retrieval of the workspace by the second user at a computer of the second user.

The virtual desktop management system may include a mobile virtual workspace software application logically connected to the desktop virtual workspace software application via the remote virtual workspace software application.

Any one or both the remote virtual workspace software application and the remotely accessible server may be cloud-based.

Any one or more of the desktop virtual workspace software application and the remote virtual workspace software application may include a menu, such as a dock, operatively providing their functionality.

The menu may include a view of the invoked contact details of the second user.

The view of the invoked contact details of the second user may include contact details of other users.

The view of the invoked contact details of the second user may be in the form of any one of a list view, a social media contacts-type view, and a messenger or chat-type view.

Any one or more of the desktop-, mobile-, and remote virtual workspace software applications may include a messaging application, such as an email or social media messaging application.

In one embodiment, a proprietary social media messaging application may be integrated into any one or more of the desktop-, mobile-, and remote virtual workspace software applications.

In another embodiment, 3$^{rd}$ party messaging and social media applications may be integrated into any one or more of the desktop-, mobile-, and remote virtual workspace software applications.

The desktop-, mobile-, and remote virtual workspace software applications may include any one of a list-, tiled-, stackable-, floating-, grid-, full-screen-, and carousel-type layout of the list of open software applications.

The virtual desktop management system may include providing users with virtual workspace templates, for "work", "social", "leisure", "personal", and the like templates.

The invention will now be described by way of a non-limiting example, with reference to the following drawings.

DRAWINGS

Figure 1:
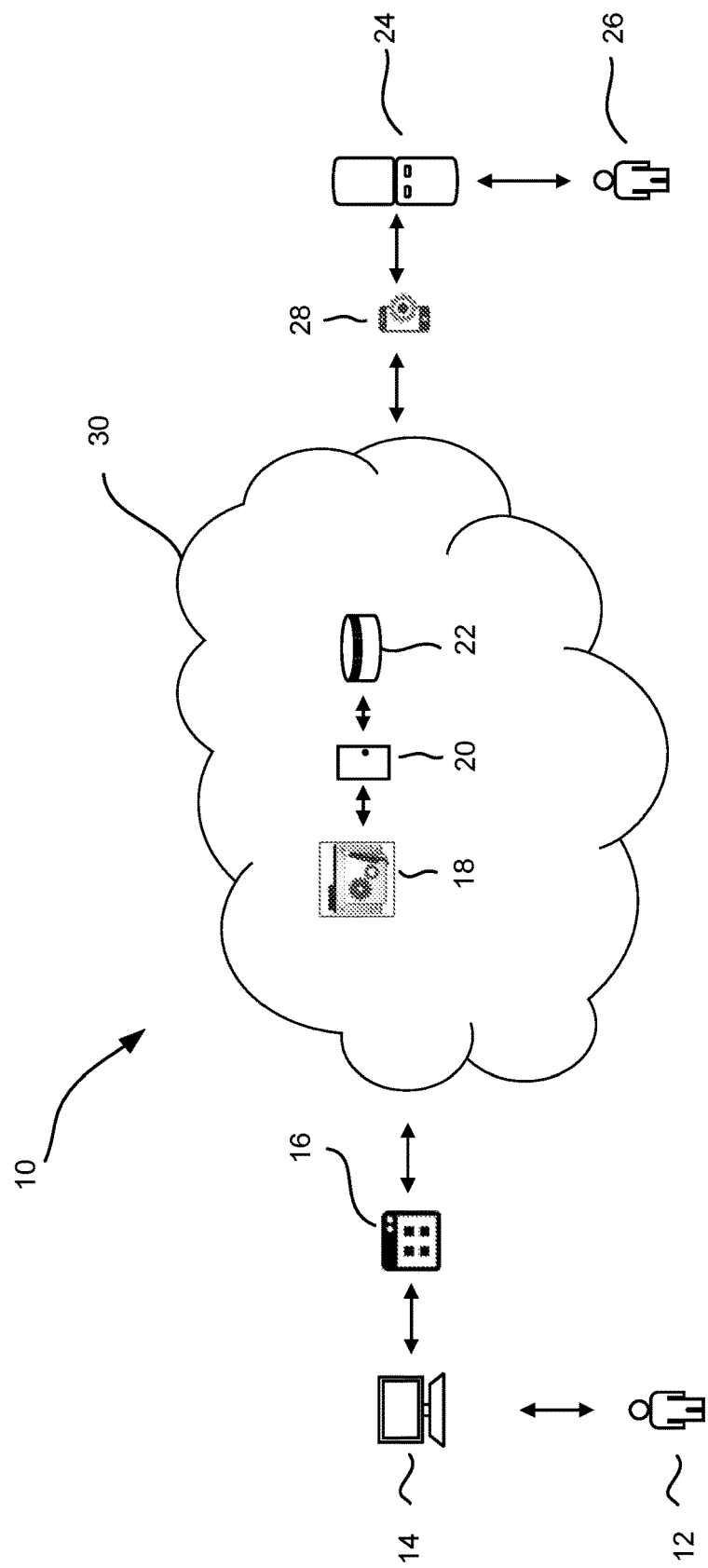
FIG. 1 shows a schematic drawing of a virtual desktop management system in accordance with one aspect of the invention.
Figure 8:
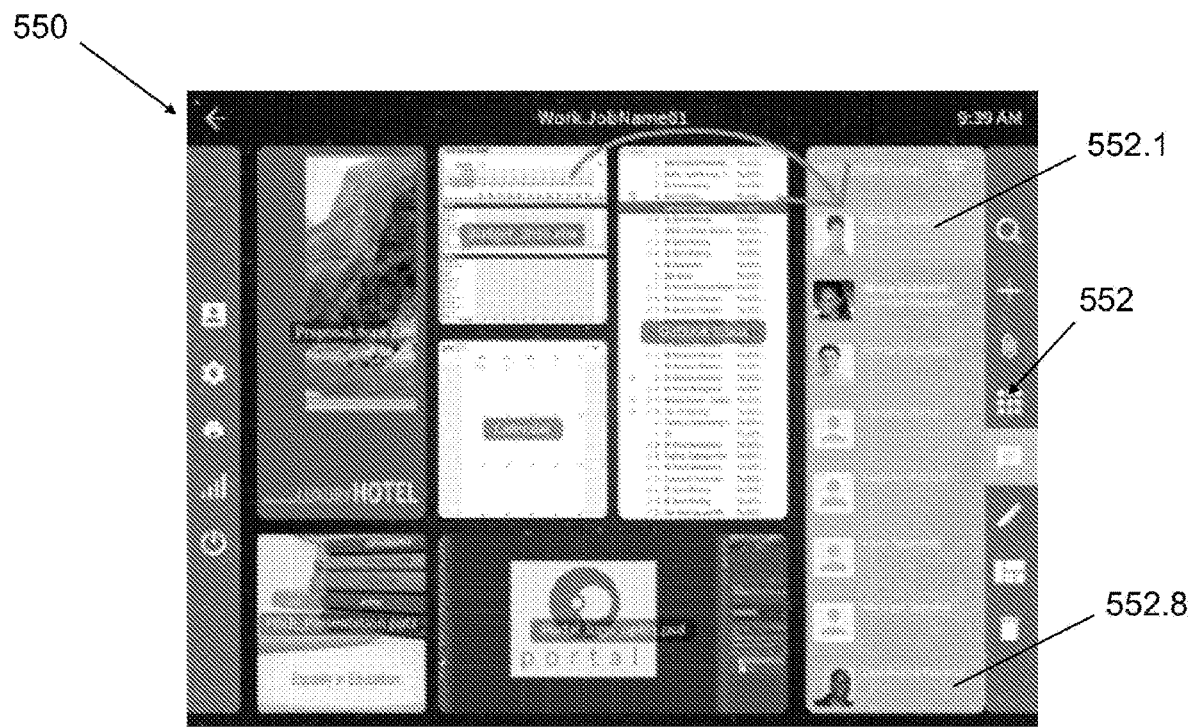
Figure 9:
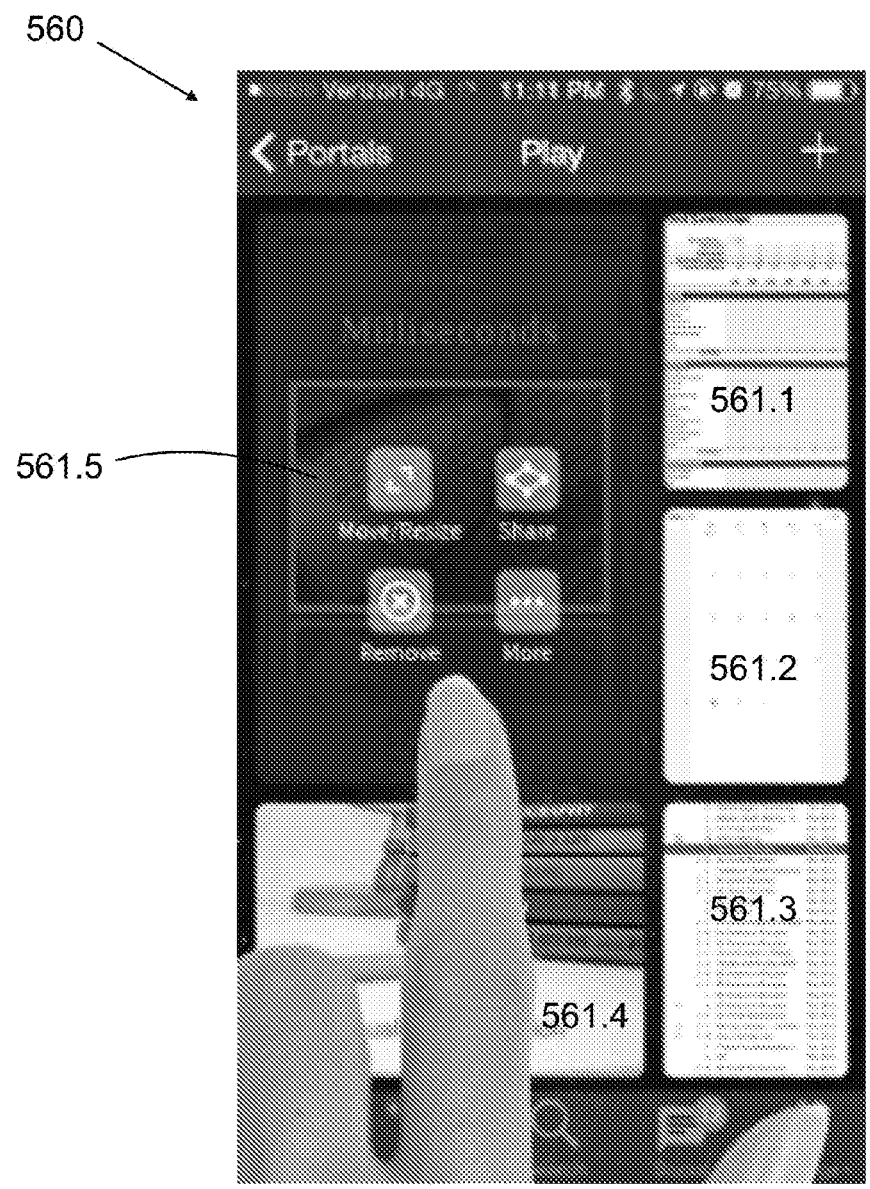

FIG. 8 shows a screenshot of the desktop virtual workspace software application installed on the computer of the first user, which allows a first user to drag and drop a file to a second user through the instant messaging application in the virtual desktop management system of FIG. 1; and FIG. 9 shows a screenshot of the layout of the mobile virtual workspace software application installed on the computer of the first user, in which the list of open applications are shown in tile-view in the virtual desktop management system of FIG. 1.

EMBODIMENT OF THE INVENTION

In FIG. 1, reference numeral (10) denotes, generally, a virtual desktop management system in accordance with an embodiment of the invention. The virtual desktop management system (10) in this embodiment includes a remotely accessible virtual workspace software application (18) resident on a remotely accessible server (20) to which a database (22) is connected, and a desktop virtual workspace software application (16) installed on a desktop computer (14) of a first user (12), wherein the desktop virtual workspace software application (16) is operable to establish a log-on session and load a desktop environment of the first user (12), capture a virtual workspace of the first user (12) by taking a snapshot of the state of the first user's computer (14), saving the virtual workspace of the first user (14) and invoking the contact details of a second user (26) for retrieval of the saved virtual workspace by the second user (26) on a mobile device (24) of the second user (26), or the retrieval of the virtual workspace by the first user (12) on the computer (14) in a subsequent log-on session.

In this embodiment, the remotely accessible virtual workspace software application (18), remotely accessible server (20), and database (22) are hosted in a cloud-based environment (30).

The system (10) includes a mobile virtual workspace software application (28) installed on the mobile device (24) of the second user (26) in logical communication with the desktop virtual workspace software application (16) via the cloud-based environment (30) wherein the remotely accessible virtual workspace software application (18) is hosted.

Figure 2:
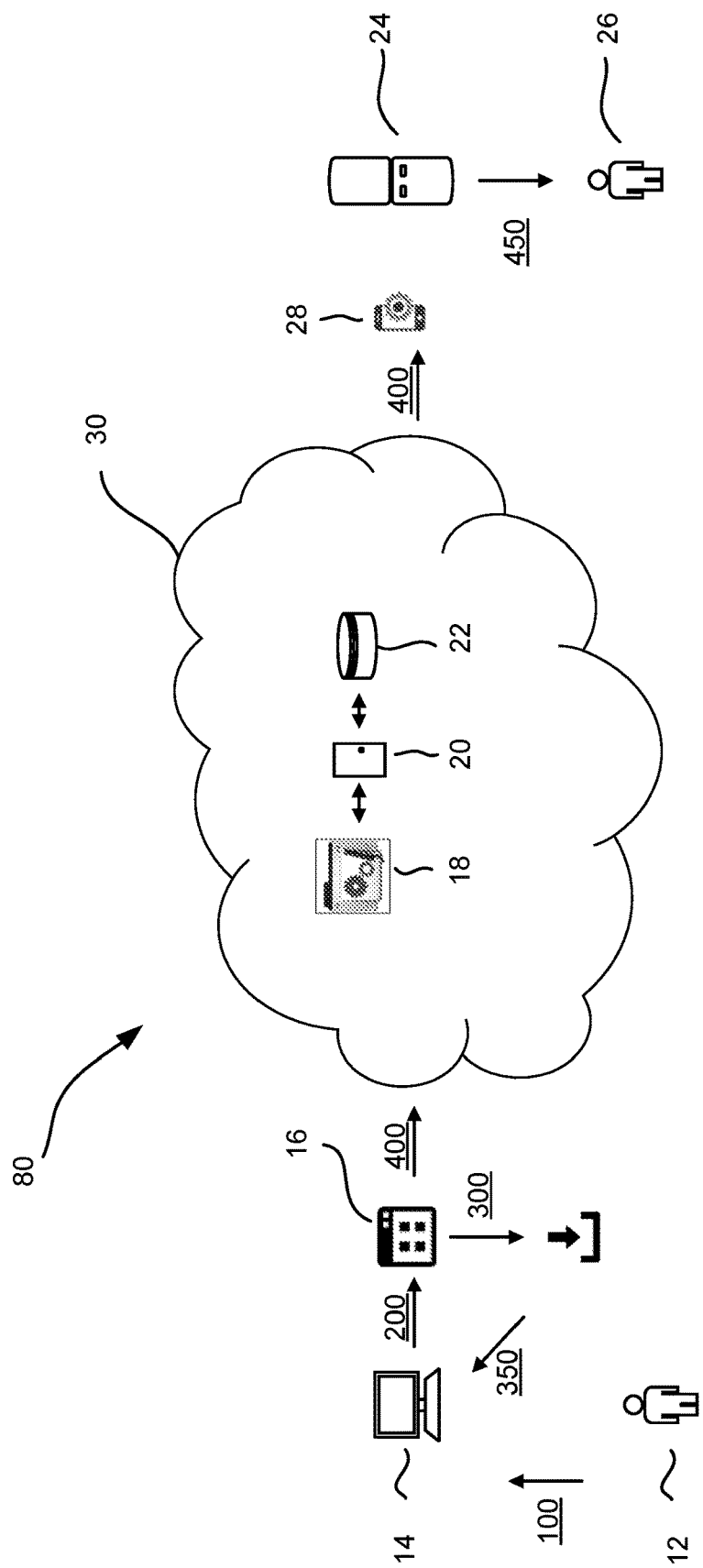
FIG. 2 shows a schematic drawing of the steps in a method of managing a virtual desktop, the method being executed by the virtual desktop management system of FIG. 1 in accordance with another aspect of the invention.

Referring to FIG. 2 of the drawings, reference numeral (80) denotes, generally, a method of virtual desktop management conducted at the virtual desktop management system (10) of FIG. 1 according to another embodiment of the invention.

At step 100, the first user (12) establishes a log-on session by logging onto their desktop computer (14), followed by step 200 wherein the desktop virtual workspace software application (16) captures a virtual workspace of the first user's (12) desktop environment by taking a snapshot of the state of the user's (12) computer (14).

The snapshot of the state of the first user's desktop includes a list of open software applications, for example a spreadsheet and a web browser, their locations on screen, and the first user's (12) desktop (14) layout. Further at step 200, the desktop virtual workspace software application (16) also captures attributes of the open software applications the application instances of the open software applications and details of files in use by the open software applications. In addition, the computer and operating system state of the first user's computer (14), such as its CPU state, memory, disk capacity and screen resolution are also captured as part of the virtual workspace.

At step 300, the captured virtual workspace is saved for retrieval of the saved workspace by the user (12) at a subsequent log-on session denoted by step 350.

The process of saving the captured virtual workspace (300) involves the following:

i. The desktop virtual workspace software application (16) compiles a list of open software applications from the Operating System. From this list, the names of the applications with which the user (12) was interacting with are extracted.

ii. The desktop virtual workspace software application (16) saves these application names to a list, as well as passing each name to a function which determines the execution path of each application (i.e. the destination of the application's .exe or .app file on the user's current machine). The execution paths are also saved to a list object within machine memory.

iii. The desktop virtual workspace software application (16) iterates through the application names list to save data regarding each application before closing it. This data usually consists of the document filename, window state and position.

iv. In order to save the documents under the correct document name, the desktop virtual workspace software application (16) saves the text found in the document application's main window handle (i.e. the title of the window the document was opened in).

v. The text representing the document name is saved as a formatted string and added to the list of documents opened in machine memory. This assists the desktop virtual workspace software application (16) in keeping a record of the data which it will work with when retrieving a session (as in step 350).

vi. The desktop virtual workspace software application (16) performs a Save-Procedure before closing any of the user's documents and notes the position in the application (i.e. the page number in a document), where the user (12) was last active.

vii. The Save File Dialogue window is displayed to give the user (12) the opportunity to save the active documents to whichever folder they please.

viii. The desktop virtual workspace software application (16) saves the path to the list which contains the save directories the user (12) had chosen to initially launch documents from. In addition, the desktop virtual workspace software application (16) also save the document to the remotely accessible virtual workspace software application (18).

ix. Any open tabs on web browsers are also saved by the desktop virtual workspace software application (16), generally in the form of extracted URLs and corresponding browser names and saved as the user's (12) online profile.

x. Finally, apart from saving a local copy of the data, the desktop virtual workspace software application (16) transfers all this saved data via the remotely accessible virtual workspace software application (18) to the database (22).

xi. Feedback is provided to the user (12) during execution of the foregoing steps, such feedback notifying the user (12) of the saving of the captured virtual workspace (300) being in progress.

xii. In this example, provision is made for the desktop virtual workspace software application (16) to save data for up to 10 sessions.

The process of retrieving the saved workspace of the user (12) at a subsequent log-on session denoted by step 350, involves the following:

i. Upon start up, the desktop virtual workspace software application (16) displays certain session specific information, such as screenshots of the user's previous sessions to the user (12).

ii. After the user (12) has selected which session he wishes to retrieve, the desktop virtual workspace software application (16) initiates the retrieval procedure.

iii. The desktop virtual workspace software application (16) transfers all session specific data from its local database or the cloud database (22) to local list objects (using stored procedures in Structured Query Language (SQL)) which are temporarily stored in machine memory. This allows for a faster retrieval process since the desktop virtual workspace software application's (16) calls to the cloud database (22) are reduced. Furthermore, it is quicker to iterate through information stored linearly in list objects as opposed to database tables and their relationships.

iv. Using the saved data, the desktop virtual workspace software application (16) will restore the applications which were launched, the documents which were opened (including document position and current page), the window state of the applications (including size and position) and the user's (12) previous online profile (the saved URLs along with the browsers they were viewed in).

v. During retrieval (350), the desktop virtual workspace software application (16) presents to the user (12) the same look and feel that the virtual workspace had when a snapshot was taken. During retrieval, feedback is provided to the user (12) on the progress of the operation via a progress bar. The user (12) is also notified of successful session retrieval.

At a next step 400, the contact details of a second user (26) are invoked by accessing a social-media messaging type list view of the second user (26) and the virtual workspace is shared with the second user (26) via the remotely accessible virtual workspace software application (18) and mobile virtual workspace software application (28) installed on the mobile device (24) of the second user (26) by way of a push notification. Thus, at 450, the virtual desktop of the first user (12) is retrieved and viewed by the second user (26).

FIGS. 3 to 9 show screenshots of variations of embodiments of the desktop virtual workspace software application as example implementations.

Figure 3:
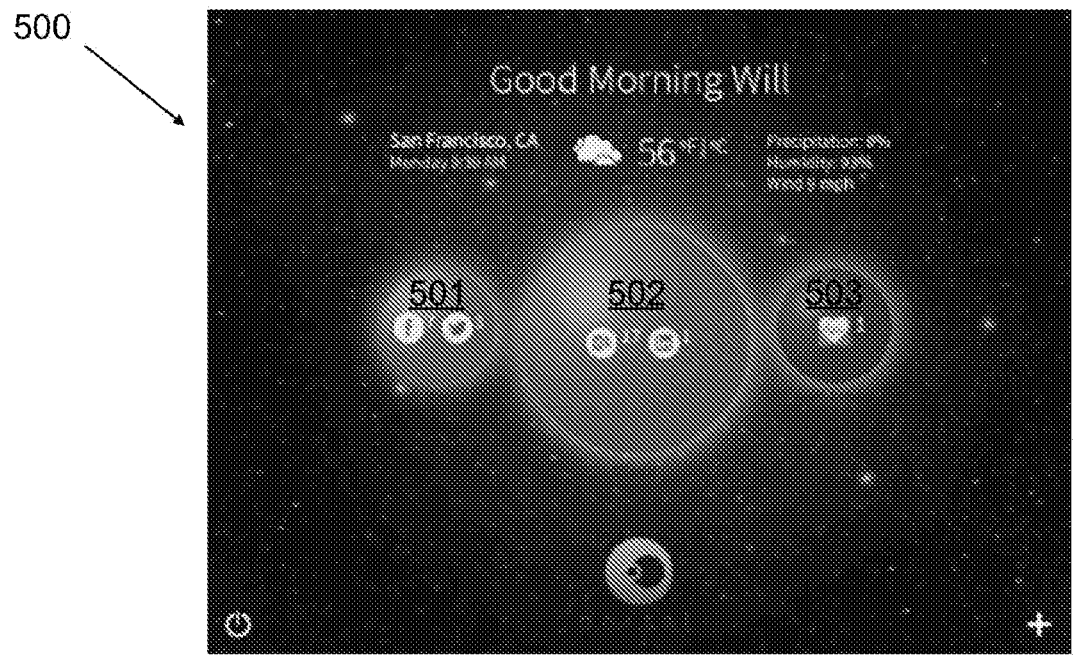
FIG. 3 shows a first user's point of engagement with the desktop virtual software application which forms part of the virtual desktop management system of FIG. 1.

FIG. 3 shows the first user's point of engagement (500) with the desktop virtual software application (16). Each sphere (501 to 503) seen in the screen above represents a virtual workspace, and the first user would typically have multiple workspaces. For example, the middle sphere (502) represents a "work" workspace, the sphere to the left (501)

represents a "social" workspace, and the sphere to the right (503) represents a "health and fitness" workspace.

In use, the first user navigates the spheres (501 to 503) by rotation, the size dynamically adjusting presenting the largest (in-focus) sphere being the actively selected one. Each sphere (501 to 503) displays the number of new notifications and messages the user has from the application within a particular workspace as a number next to a logo of the application.

Figure 4:
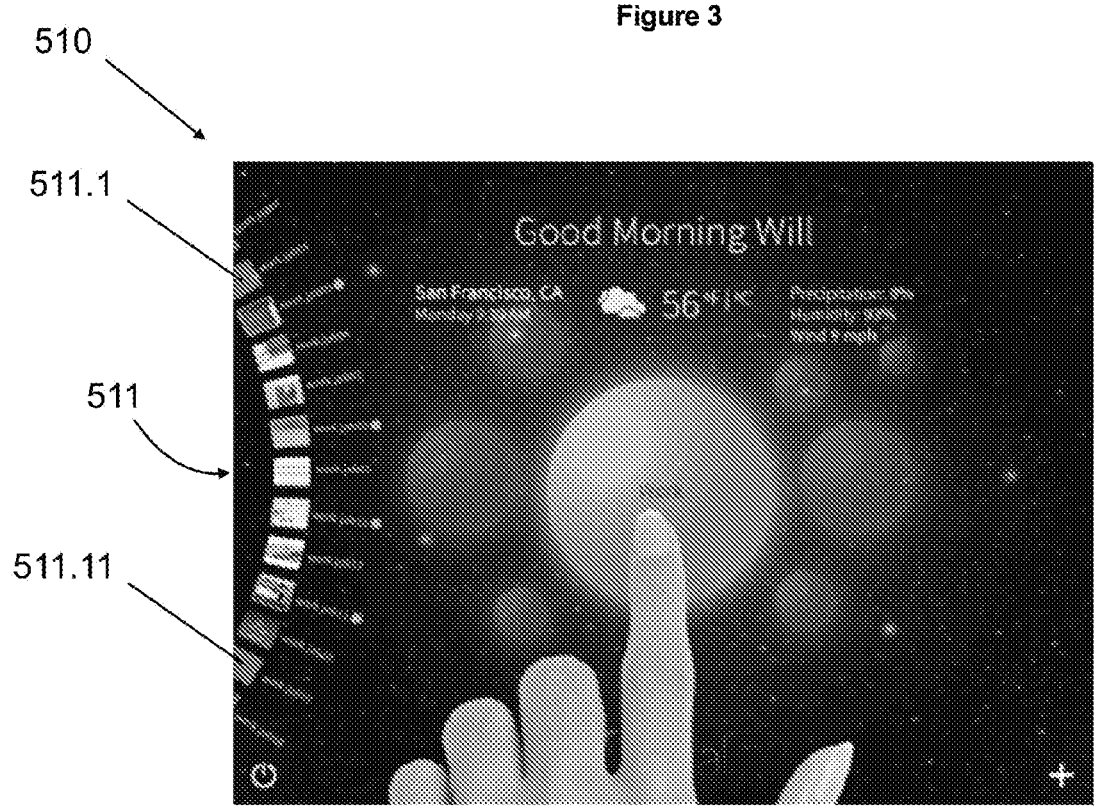
FIG. 4 shows a screenshot of multiple workspaces presented to the first user after establishing the first user's log-on session and loading of the user's desktop on the computer of the first user in the virtual desktop management system of FIG. 1.

FIG. 4 shows a screenshot (510) of the multiple workspaces (511) presented to the first user (12) after establishing the first user's log-on session and loading of the user's desktop on the computer of the first user. In this example, the previously saved virtual workspace sessions (511.1 to 511.11) have been loaded and are visible as a stack to the left of the screen. The user can then scroll through the sessions (511) and select a particular session by clicking on the relevant session (511.1 to 511.11).

Figure 5:
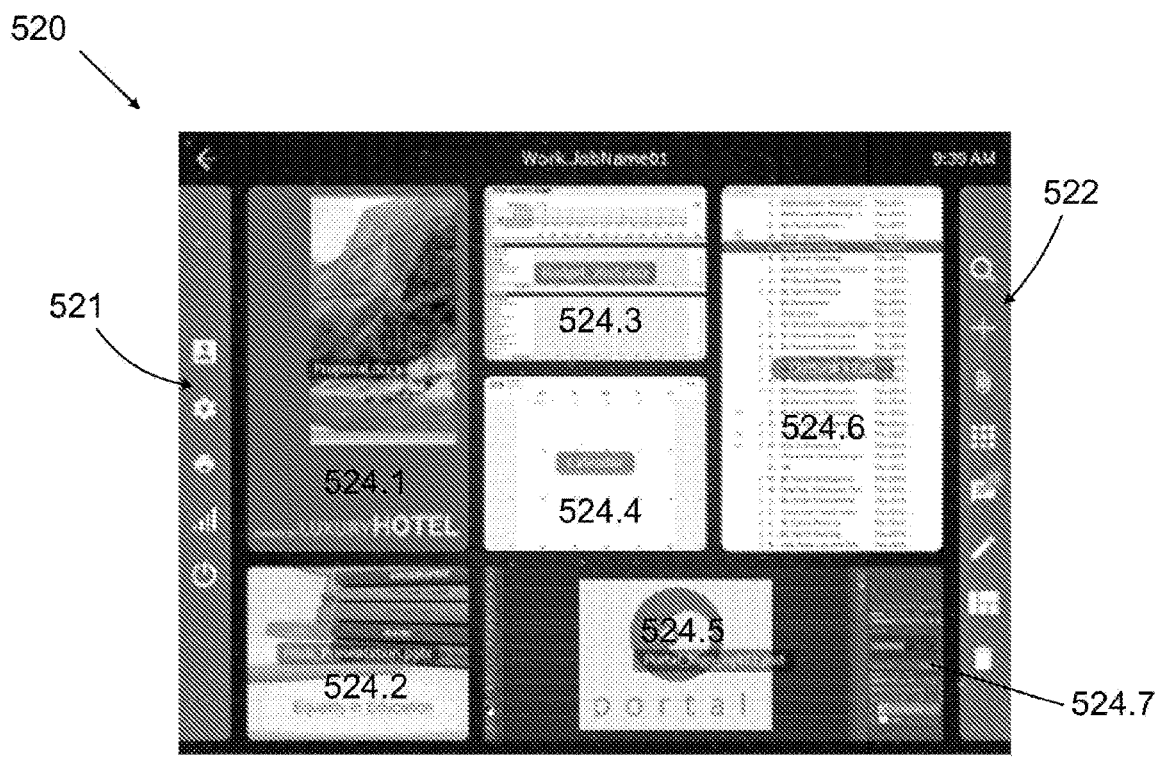
FIG. 5 shows a screenshot of the desktop virtual workspace software application installed on the computer of the first user, in which the layout is a tile-type layout of the list of open software applications of the user's desktop on the computer of the first user in the virtual desktop management system of FIG. 1.

FIG. 5 shows a screenshot (520) of an example of the layout of the desktop virtual workspace software application (16) installed on the computer of the first user (12). The desktop virtual workspace software application (16) includes session menus (521 and 522) to the left and the right of the screen respectively. The remainder of the screen is occupied by open software applications (524.1 to 524.7), such as spreadsheets, file explorer windows and other applications. The menu (521) includes the following buttons: User—to access a user, Settings—to access the settings of the virtual desktop management system; Print—to print a particular document in a session, Volume/Screen brightness—to adjust the volume and/or screen brightness, Power on/off—to switch on/off the virtual desktop management system. The menu (522) includes the following buttons: Search—to search for a document or session, Open session—to open another session, Clipboard—to move information from and to a clipboard, Options—to access different programs in a session, Instant messaging—to send/receive instant messages for other users in a session, Notes—To make/read notes, Reshape—to reshape the templates on the screen, Trash—to delete documents.

Figure 6:
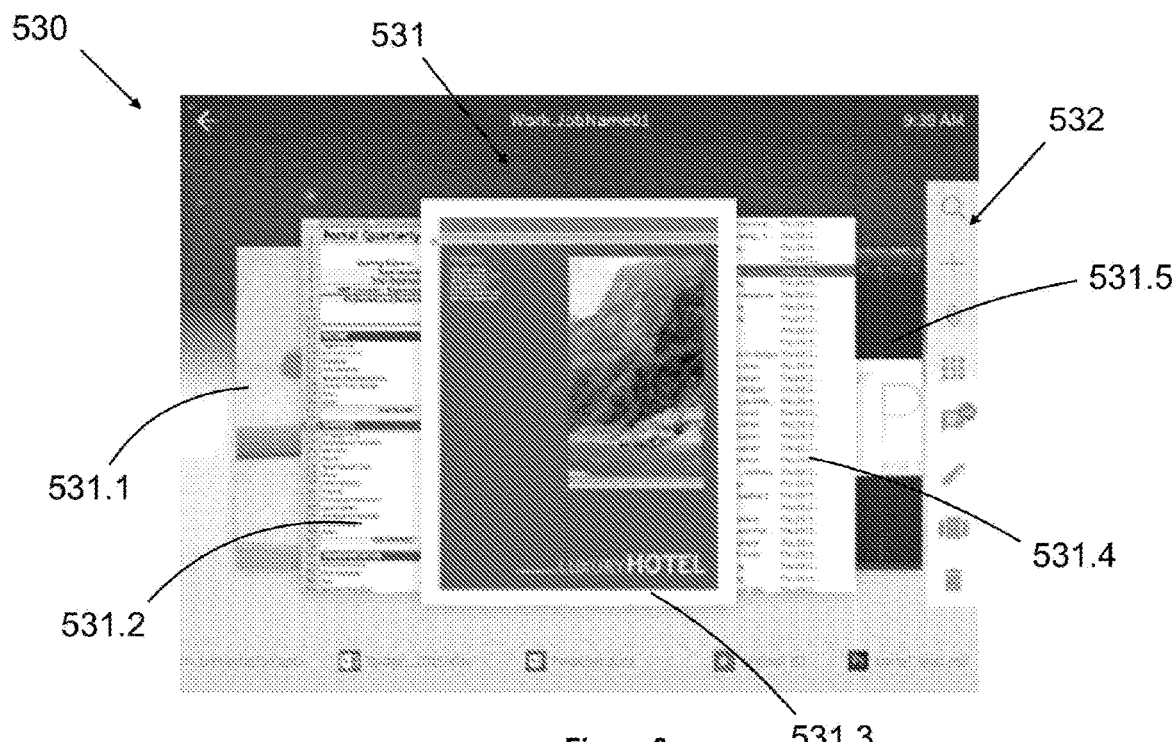
FIG. 6 shows a screenshot of the layout of the desktop virtual workspace software application installed on the computer of the first user, in which the layout is a carousel-type layout of the list of open software applications of the user's desktop on the computer of the first user in the virtual desktop management system of FIG. 1.

FIG. 6 shows a screenshot (530) of the layout of the desktop virtual workspace software application (16) installed on the computer (14) of the first user (12). In this example, the layout is a carousel-type layout (531) of the list of open software applications (531.1 to 531.5). A session menu (532) is integrated at a right side of the screen (530).

Figure 7:
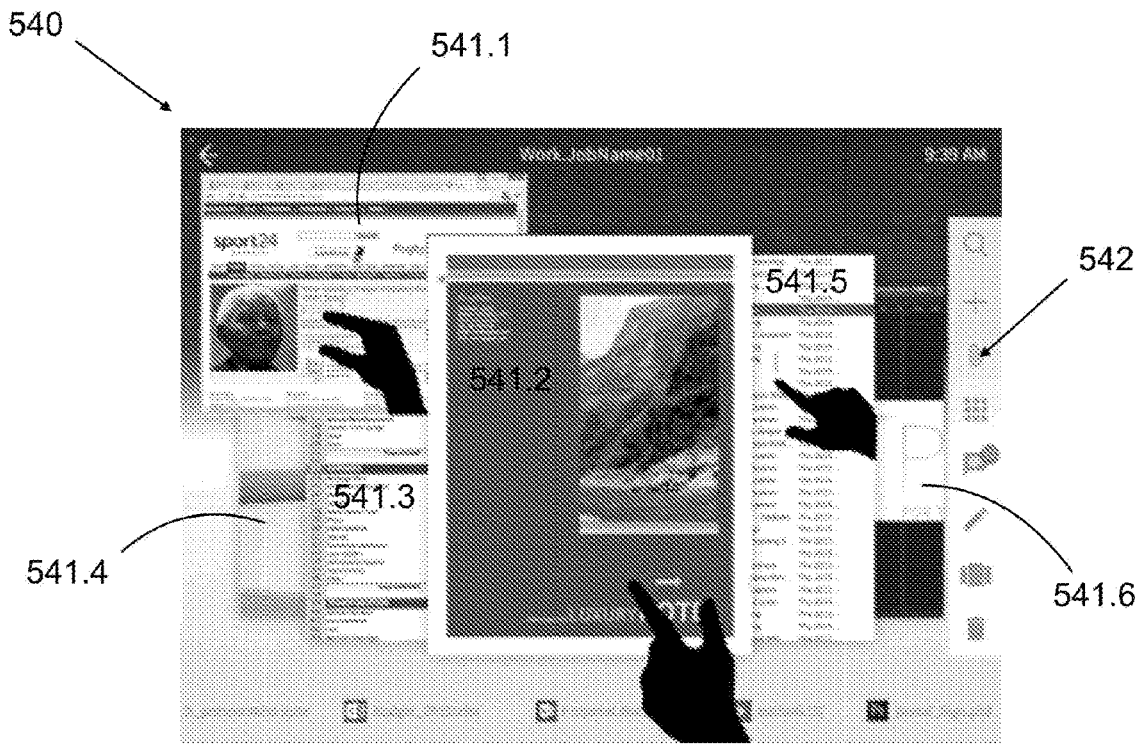
FIG. 7 shows a screenshot of the desktop virtual workspace software application installed on the computer of the first user, in which the layout is a floating-type layout of the list of open software applications of the user's desktop on the computer of the first user in the virtual desktop management system of FIG. 1.

FIG. 7 shows a screenshot (540) of the desktop virtual workspace software application (16) installed on the computer (14) of the first user (12). In this example, the layout is a floating-type layout of the list of open software applications (541.1 to 541.6) arranged on the desktop. A session menu (542) is integrated at a right side of the screen (540).

FIG. 8 shows a screenshot (550) of the layout of the desktop virtual workspace software application installed (16) on the computer (14) of the first user (12). In this example, user menu (552) shows the users in a session. The virtual workspace software application (16) allows a first user to drag and drop a file from the desktop to a second user (552.1 to 552.8) through the user menu (552).

FIG. 9 shows a screenshot (56) of a layout of the mobile virtual workspace software application (16) installed on a mobile device (not shown) of the first user (12). The open software applications (561.1 to 561.4) are arranged on the desktop in tile fashion. One application 561.5 has been selected and the user is presented with option to move, share or remove the application from the desktop. Further options are provided under the "More" button.

Advantageously, the virtual desktop management method and system as hereinbefore described provides users with an online collaboration software solution—users are provided:

the ability to browse, manipulate and organize multiple documents and applications in a streamlined environment to optimize user productivity;

accessing of workspaces without having to re-open documents and applications;

the ability to work with multiple documents and applications simultaneously; collaborative functionality to transfer established workspaces to other users of computers and personal electronic, mobile, and web devices;

drag-and-drop functionality for file sharing between users; the leveraging of user behavior for future system upgrades and optimization; and the monetization of user data for marketing and commercial purposes.

The invention claimed is:

1. A virtual desktop management method, the method being conducted by a virtual desktop management system, the method including:

establishing a log-on session and loading a first user's desktop on a computer of the first user;

capturing a virtual workspace by taking a snapshot of the state of the first user's desktop, the snapshot of the state of the first user's desktop including any one or more of a list of open software applications, their locations on screen, and a desktop layout of the first user, and the capturing of the virtual workspace including capturing of attributes of the open software applications, the attributes including any one or more of: one or more folder sessions; session name; session date; application name; application instance; window state; window position; window height and width; platform operating system name and version; platform machine name; platform screen resolution; and document or uniform resource locator (URL) name;

saving the captured virtual workspace of the first user;

invoking contact details of a second user;

presenting the first user with a view of the contact details of the second user via an Internet messaging application; and sharing the captured virtual workspace with the second user for retrieval of the virtual workspace by the second user on a computer of the second user during the log-on session or during a subsequent log-on session, wherein subsequent to establishing the log-on session, a routine of user selected tasks is performed, the routine of user-selected tasks including the opening of the one or more folder sessions and software applications within the virtual workspace, and the first user selects and shares files and attachments with the second user via the Internet messaging application.

2. The virtual desktop management method as claimed in claim 1, in which the steps of capturing a virtual workspace and saving the captured virtual workspace are implemented by any one or more of a desktop virtual workspace software application installed on the computer of the first user, and a mobile virtual workspace software application installed on the computer of the first user, and wherein the Internet messaging application is a social media Internet messaging application which includes any one or more of: an Instant Messenger (IM) application and a social media messenger application.

3. The virtual desktop management method as claimed in claim 2, which includes the step of hosting a remote virtual workspace software application on a remotely accessible server to which any one or more of the desktop- and mobile virtual workspace software applications are logically connected and wherein sharing of the virtual workspace with the second user includes transmitting the virtual workspace to the second user via the remote virtual workspace software application.

4. The virtual desktop management method as claimed in claim 3, in which any one or more of the desktop-, mobile-, and remote virtual workspace software applications includes a menu, operatively providing the software applications' functionality, and in which the menu includes the view of the invoked contact details of the second user.

5. The virtual desktop management method as claimed in claim 4 in which any one or more of the desktop-, mobile-, and remote virtual workspace software applications include the social media Internet messaging application being integrated into any one or more of the desktop-, mobile-, and remote virtual workspace software applications.

6. The virtual desktop management method as claimed in claim 5, in which the step of sharing the virtual workspace with the second user includes sharing the virtual workspace via push technology and in which a virtual workspace software application of the second user is operable to launch a session sent via the push technology, by accessing data from the remotely accessible server.

7. The virtual desktop management method as claimed in claim 6, in which the step of saving the captured virtual workspace of the first user includes saving the virtual workspace to any one or more of the first user's computer locally and the remotely accessible server that hosts the remote virtual workspace software application.

8. The virtual desktop management method as claimed in claim 7, in which the virtual workspace is saved as a template for "work", "social", "leisure", and "personal" templates.

9. The virtual desktop management method as claimed in claim 8, in which the method includes retrieving of the saved virtual workspace from the remotely accessible server that hosts the remote virtual workspace software application in a subsequent log-on session by any one or more of the first and second users.

10. A virtual desktop management system which includes:
a remote virtual workspace software application resident on a remotely accessible server to which a database is connected; and
a desktop virtual workspace software application operationally installed on a computer of a first user, wherein the desktop virtual workspace software application is operable to:
establish a log-on session and load a desktop of the first user on the computer of the first user;
capture a virtual workspace of the first user by taking a snapshot of the state of the first user's computer, the snapshot of the state of the first user's desktop including any one or more of a list of open software applications, their locations on screen, and a desktop layout of the first user, and the capture of the virtual workspace including capturing of attributes of the open software applications, the attributes including one or more folder sessions and a document or uniform resource locator (URL) name;
save the virtual workspace of the first user;
invoke the contact details of a second user;
present the first user with a view of the contact details of the second user via an Internet messaging application; and
share the captured virtual workspace with the second user for retrieval of the workspace by the second user at a computer of the second user during the log-on session or during a subsequent log-on session, wherein subsequent to establishing the log-on session, a routine of user selected tasks is performed, the routine of user-selected tasks including the opening of the one or more folder sessions and software applications within the virtual workspace, and wherein the first user selects and shares files and attachments with the second user via the Internet messaging application.

11. A virtual desktop management system as claimed in claim 10, in which the virtual desktop management system includes a mobile virtual workspace software application logically connected to the desktop virtual workspace software application via the remote virtual workspace software application, and wherein the Internet messaging application is a social media Internet messaging application which includes any one or more of: an Instant Messenger (IM) application and a social media messenger application.

12. A virtual desktop management system as claimed in claim 11, in which the menu of any one or more of: the desktop virtual workspace software application and the remote virtual workspace software application includes the-view of the invoked contact details of the second user.

13. The virtual desktop management system as claimed in claim 12, in which any one or more of the desktop-, mobile-, and remote virtual workspace software applications have the social media Internet messaging application integrated into any one or more of the desktop-, mobile-, and remote virtual workspace software applications.

14. The virtual desktop management system as claimed in claim 13, which includes templates for saving the virtual workspace as "work", "social", "leisure", and "personal" templates.

* * * * *